United States Patent
Eichenberger et al.

(10) Patent No.: US 10,162,634 B2
(45) Date of Patent: Dec. 25, 2018

(54) EXTENDABLE CONDITIONAL PERMUTE SIMD INSTRUCTIONS

(71) Applicant: International Business Machines Corporation, Armonk, NY (US)

(72) Inventors: Alexander E. Eichenberger, Chappaqua, NY (US); Bruce M. Fleischer, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 15/160,217

(22) Filed: May 20, 2016

(65) Prior Publication Data

US 2017/0337059 A1 Nov. 23, 2017

(51) Int. Cl.
*G06F 9/30* (2018.01)

(52) U.S. Cl.
CPC ...... *G06F 9/30036* (2013.01); *G06F 9/30032* (2013.01); *G06F 9/30112* (2013.01)

(58) Field of Classification Search
None
See application file for complete search history.

(56) References Cited

U.S. PATENT DOCUMENTS

| | | | | |
|---|---|---|---|---|
| 5,872,965 | A * | 2/1999 | Petrick | G06F 9/30058 345/501 |
| 5,996,057 | A * | 11/1999 | Scales, III | G06F 9/30032 712/4 |
| 7,000,099 | B2 * | 2/2006 | Sazegari | G06F 7/764 712/300 |
| 7,725,678 | B2 * | 5/2010 | Krueger | G06F 7/76 712/4 |
| 7,873,812 | B1 | 1/2011 | Mimar | |
| 8,312,069 | B2 * | 11/2012 | Gemmeke | G06F 13/4217 708/200 |
| 2003/0172254 | A1 * | 9/2003 | Mandavilli | G06F 7/5324 712/224 |

(Continued)

OTHER PUBLICATIONS

Talla, D., et al., "Bottlenecks in Multimedia Processing with SIMD Style Extensions and Architectural Enhancements", IEEE Transactions on Computers, Aug. 2003, pp. 1-17, vol. 52, No. 8.

(Continued)

*Primary Examiner* — Eric Coleman
(74) *Attorney, Agent, or Firm* — Fleit Gibbons Gutman Bongini Bianco PL; Donna Flores

(57) ABSTRACT

A method, apparatus and non-transitory computer readable medium are provided for permuting data registers to a target register. Two or more data registers are concatenated to form a concatenated data register. Each data register comprises a plurality of elements. A permutation instruction which uses one of the data registers as a data input register is executed and conditionally selects an element of the data input register by comparing a portion of an element of a pattern register to an immediate match field value. The selected element of the data input register is copied to an element in a target register at a position corresponding to a position of the element of the pattern register when the portion of the element of the pattern register matches the immediate match field value. When the portion of the element of the pattern register does not match, the target register remains unchanged.

20 Claims, 3 Drawing Sheets

(56) References Cited

U.S. PATENT DOCUMENTS

| | | | |
|---|---|---|---|
| 2004/0193850 A1* | 9/2004 | Lee | G06F 9/30032 |
| | | | 712/225 |
| 2008/0184007 A1* | 7/2008 | Codrescu | G06F 9/30032 |
| | | | 712/1 |
| 2009/0150648 A1 | 6/2009 | Mejdrich | |
| 2009/0172366 A1* | 7/2009 | Anderson | G06F 9/30032 |
| | | | 712/225 |
| 2010/0095087 A1 | 4/2010 | Eichenberger et al. | |
| 2013/0275730 A1* | 10/2013 | Ould-Ahmed-Vall | |
| | | | G06F 9/3001 |
| | | | 712/222 |
| 2014/0372727 A1 | 12/2014 | Valentine et al. | |
| 2015/0058603 A1 | 2/2015 | Anderson et al. | |

OTHER PUBLICATIONS

Huang, L., et al., "Permutation Optimization for SIMD Devices", Proceedings of the 2010 IEEE International Symposium on Circuits and Systems, May 30-Jun. 2, 2010, pp. 1-4.

Disclosed Anonymously, "A Unified Scalar and SIMD Instruction Set Architecture: Repurposing a Scalar Instruction Set for SIMD Instruction via Mode-Sensitive Semantics", May 5, 2015, IP.com No. 000241485, pp. 1-4.

Software Patent Institute, et al.,"Parallel Permutation and Sorting Algorithms and a New Generalized-Connection-Network", Apr. 30, 1979, IP.com No. 000151815, pp. 1-41.

* cited by examiner

EXTENDABLE CONDITIONAL PERMUTE SIMD INSTRUCTIONS

BACKGROUND

Field of Invention

The present disclosure generally relates to permute instructions, and more particularly relates to an extendable, conditional permute instruction which uses a single vector data input.

Description of the Related Art

The amount of logic, and therefore hardware, needed for a Single Instruction Multiple Data (SIMD) vector permute instruction grows with the number of elements per vector to choose from, the number of vector input operands, and the number of bits per vector. For example, the IBM Cell SPU architecture supports permuting bytes from two 128-bit vectors (32:1×128 bits), the IBM BG/Q architecture supports permuting 64-bit elements from two 256-bit vectors (8:1×256 bits), and the Intel SSE architecture supports permuting bytes within one 128-bit vector (16:1×128 bits).

Combining the best of these architectures would offer a very powerful permute operation, but would require significant growth in the physical size of the permute logic, or the execution of greater than five instructions and the use of additional registers.

As the logic becomes increasingly expensive, the permute latency may also increase as more values must propagate to more places. Additionally, a wider SIMD also means that distributed SIMD banks are further apart.

For architectures with efficient unaligned memory operations, two input permutes become less critical. Thus, the optimum area/latency balance to maintain the architected functionality may shift towards a smaller area.

BRIEF SUMMARY

In one embodiment, a method for permuting data registers to a target register is disclosed. The method comprises concatenating two or more data registers to form a concatenated data register. Each data register comprises a plurality of elements. A permutation instruction is executed which uses one of the data registers as a data input register and conditionally selects an element of the data input register by comparing a portion of an element of a single pattern register to an immediate match field value. The selected element of the data input register is copied to an element in a target register at a position corresponding to a position of the element of the single pattern register when the portion of the element of the single pattern register matches the immediate match field value. When the portion of the element of the single pattern register does not match the immediate match field value, the target register remains unchanged.

In another embodiment, an apparatus comprises a memory and a controller. The memory has a plurality of data registers, a pattern register, a target register, an immediate match field value and a permutation instruction. The controller is communicatively coupled to the memory. The controller concatenates two or more data registers to form a concatenated data register. Each data register comprises a plurality of elements. The permutation instruction, which uses one of the data registers as a data input register, is executed and conditionally selects an element of the data input register by comparing a portion of an element of the pattern register to the immediate match field value. The selected element of the data input register is copied to an element in the target register at a position corresponding to a position of the element of the single pattern register.

In yet another embodiment, a non-transitory computer readable medium is disclosed which comprises instructions that, when executed by a controller of a computer, cause the controller to concatenate two or more data registers to form a concatenated data register. Each data register comprises a plurality of elements. The controller further executes a permutation instruction which uses one of the data registers as a data input register and conditionally selects an element of the data input register by comparing a portion of an element of a single pattern register to an immediate match field value, and copies the selected element of the data input register to an element in a target register at a position corresponding to a position of the element of the single pattern register.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

In this disclosure, an extendable, conditional permute instruction is disclosed which uses just one vector input, but conditions the selection of an element from that vector on matching between bits in the permute mask and an immediate field in the instruction. Permutation from two (or even N>2) vector inputs may be performed by executing two (N) instructions with the same permute mask. The physical size of the permute logic is only minimally larger than that needed for a prior-art permute from one register.

Figure 1:
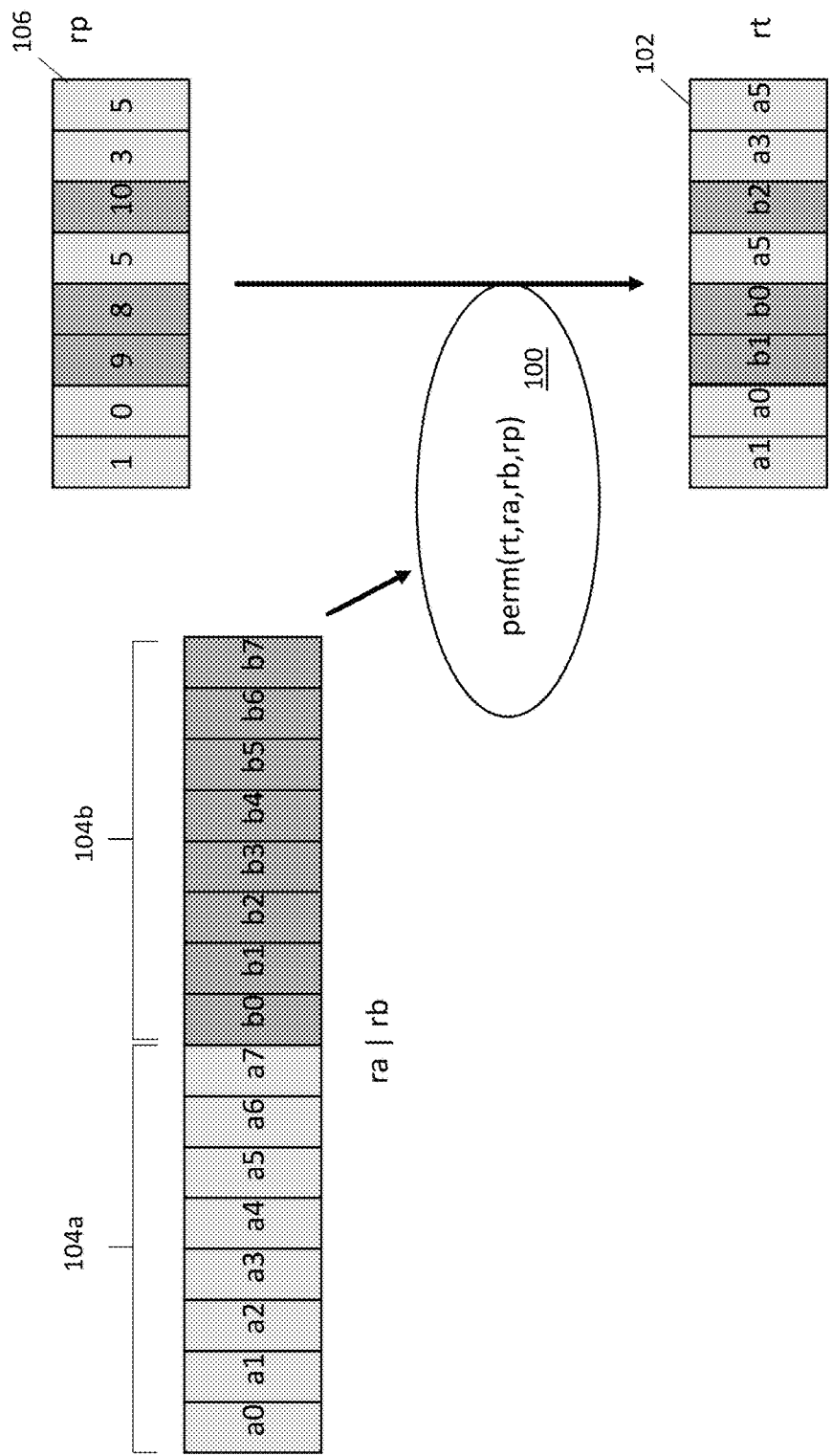
FIG. 1 is an illustration of a prior art two input permute instruction.

FIG. 1 shows one example of a prior art two input permute instruction 100 of the form perm(rt, ra, rb, rp) where rt is the target register 102, ra and rb are the two data input registers 104$a$ and 104$b$, respectively, and rp is a pattern register 106. The target register 102, the data input registers 104$a$, 104$b$ and the pattern register 106 are all vector registers. The target register 102 (rt) is the register where the data from the data input registers 104$a$, 104$b$ (ra, rb) is to be copied. Each data input register 104$a$, 104$b$ contains V=eight data elements denoted as $a_0$-$a_7$ and $b_0$-$b_7$. The pattern register 106 and target register 102 also contain V data elements.

In the example of FIG. 1, when the permute instruction 100 is executed, data input registers 104$a$, 104$b$ are concatenated together such that the position of $a_0$=0, $a_1$=1, ..., $b_7$=15. Each element of the pattern register 106 is a 4-bit element of the form P=$mp_0p_1p_2$, consisting of an m-bit and a sub pattern $p=p_0p_1p_2$, such that the maximum value of the pattern P is $2V-=15$. The value of each 4-bit element of the pattern register 106 denotes the corresponding position of the element of the concatenated data input registers 104a, 104b that is to be copied to the target register 102. If $0 \leq P<V$, the $P^{th}$ element of the concatenated data registers 104 is selected (i.e. the $p^{th}$ element of data input register 104a (ra)). If $V \leq P<2V$, then the $p^{th}=(P-V)^{th}$ element of the concatenated data registers 104 is selected (i.e. the $p^{th}$ element of data input register 104b (rb)). It should be noted that the m-bit of each pattern register element actually selects ra or rb, while the value of the remaining 3 bits (p) determines the position of the data input element to be copied. In FIG. 1, the value of the pattern register 106 is 1•0•9•8•5•10•3•5, thus the data input elements copied into target register 102 are $a_1$•$a_0$•$b_1$•$b_0$•$a_5$•$b_2$•$a_3$•$a_5$.

The existing permute instruction 100 is limited in that it can only handle the two specified data input registers 104a, 104b.

Figure 2:
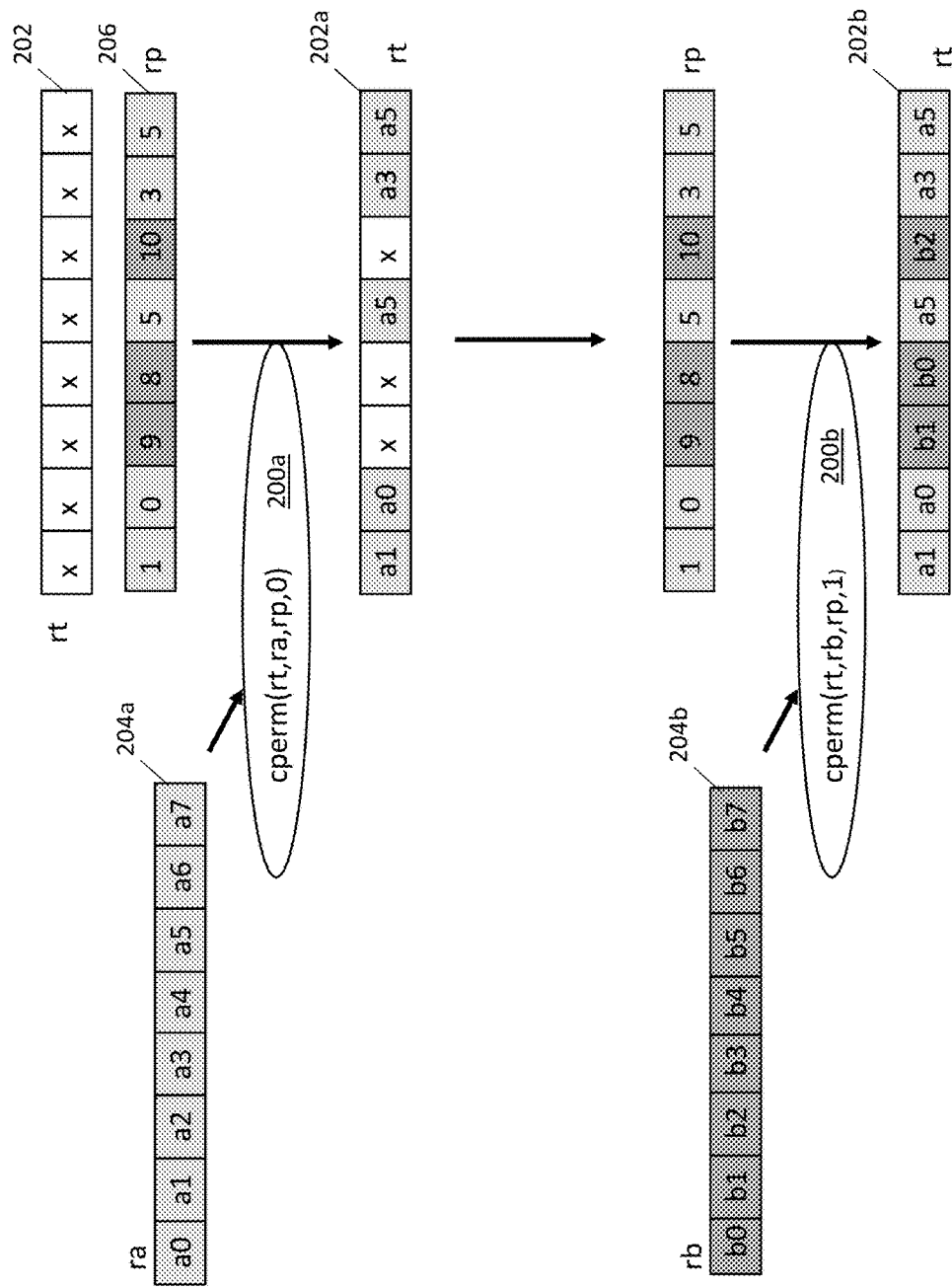
FIG. 2 is an illustration of a conditional permute instruction which is able to perform a two or more input permutation by selecting a single data input vector without loading a new pattern according to an embodiment of the present disclosure.

Turning now to FIG. 2, an extendable permute instruction 200 of the form cperm (rt, ri, rp, M) where rt is the target register 202, ri is a data input register, such as ra 204a and rb 204b, and rp is a pattern register 206. The target register 202 (rt), data input register (ri) and the pattern register 206 (rp) are all vector registers and M is an immediate match field. Extendable permute instruction 200 uses each element of the pattern register 202 to conditionally select an element of a single data input register ri. By executing the extendable permute instruction 200 more than once with the same target register 202 and pattern 206, but different data input register and immediate match field M, the extendable permute instruction 300 is able to emulate permuting from a wider source.

Each element rp[i] of the pattern register 206 contains a pattern match field and an index field. The extendable permute instruction 200 permutes the data from the data input register 204 to the target register 202 conditioned by the match fields. Each element of the pattern register 206 is of the form $P=mp_0p_1p_2$, where m is an index and $p=p_0p_1p_2$ denotes the position of the element in the data input register 204 to be copied. If the value of m in the pattern register element (rp[i].m) matches the value of M in the extendable permute instruction 200, then the $p^{th}$ element from the data input register 204 is copied to the corresponding element of the target register 202 (i.e. if rp[i].m=M then rt[i]←ri[rp[i].p]). However, if the value of m in the pattern register element does not match the value of M in the extendable permute instruction 200, then the value of the corresponding element of the target register 202 is unchanged (i.e. if rp[i].m≠M then rt[i] is unchanged).

In FIG. 2, the extendable permute instruction 200 is used to emulate the results obtained from the static two data input permutation 100 in FIG. 1. In this case, the extendable permute instruction 200 is executed twice, the first instance using data input register 204a (ra) as the input vector and the second instance using data input register 204b (rb) as the input vector. As above, the data input registers 204a, 204b are concatenated, thus the position of the elements of data input register 204a (ra) corresponds to 0 through 7, while the position of the elements of data input register 204b (rb) corresponds to 8 through 15.

The extendable permute instruction 200 is first performed on data input register 204a (ra) using the form cperm(rt, ra, rp, 0). Thus, whenever the value of m=0 in an element of rp, the corresponding element if data input register 204a (ra) is copied into target register 202 (rt). Whenever the value of m=1, the corresponding element of the target register 202 (rt) remains unchanged. Using the example value of the pattern register 206, 1•0•9•8•5•10•3•5, for the first element rp[0]=1, the bits of the pattern element are 0001, so m=0, p=1, and the value of $a_1$ is copied into the first element of target register 202 (i.e. rt[0]=$a_1$). The second element of the pattern register rp[1]=0, thus the bits are 0000, m=0, p=0 and the value of $a_0$ is copied into the second element of target register 202 (i.e. rt[1]=$a_0$). However, the third element of the pattern register rp[3]=9, thus the bits are 1001, m=1 and the value of the third element rt[2] of target register 202 remains unchanged. This process is repeated for each element in the pattern register 206. As shown by the resulting target element 202a, the first iteration of the extendable permute instruction 200 results in a target register 202 where all the elements corresponding to positions in data input register 204a (ra) have been permuted to contain the values of data input register 204a (ra), while the remaining elements are unchanged.

The extendable permute instruction 200 is then performed on data input register 204b (rb) using the form cperm(rt, rb, rp, 1). Referring back to the example contents of pattern register 206, 1•0•9•8•5•10•3•5, for the first element rp[0]=1, the bits of the pattern element are 0001, so m=0 and the value the first element of target register 202 (rt[0]) remains unchanged (i.e. rt[0]=$a_1$). The second element of the pattern register rp[1]=0, thus the bits are 0000, m=0 and the value of the second element of target register 202 (rt[1]) also remains unchanged (i.e. rt[1]=$a_0$). However, the third element of the pattern register rp[3]=9, thus the bits are 1001, m=1, p=1, and the value of the first element of data input register 204b is copied into the third element of target register 202 (i.e. rt[2]=$b_1$). This process is repeated for each element in the pattern register 206. As shown by the resulting target element 206b, the second iteration of the extendable permute instruction 200 results in a target register 202b where all the elements corresponding to positions in data input register 204b (rb) have been permuted to contain the values of data input register 204b (rb), while the remaining elements are unchanged, or in other words, the remaining elements contain the values of data input register 204a (ra) which were copied to the target register 202 during the first iteration.

The beauty of the extendable permute instruction 200 is that the number and size of data input registers 204 that may be permuted is changeable depending upon the combined m/p as an index. The element size and count are arbitrary and values in this disclosure are for illustrative purposes only. The number of p bits is $\log_2 V$. The total number of m and p bits is limited only by the element size. For example, if M is a 1-bit immediate, and rt, ri and rp are 32 byte vectors, two concatenated data input registers may be permuted to the target register using the conditional permute $rp[i]=xxm_0p_0p_1p_2p_3p_4$, such that rt[i]←ri[p] if m=M, else rt[i] remains unchanged. The operation involves executing the extendable permute instruction 200 twice: cperm(rt, ra, rp, 0) and cperm(rt, rb, rp, 1), using a single setup of the pattern register.

However, if M is a 2-bit immediate, and rt, ri and rp are 32 byte vectors, four concatenated data input registers may be permuted to the target register using the conditional permute $rp[i]=0m_0m_1p_0p_1p_2p_3p_4$, such that rt[i]←ri[p] if m=M, else rt[i] remains unchanged. The operation involves executing the extendable permute instruction 200 four times with a single pattern setup: cperm(rt, ri1, rp, 00), cperm(rt, ri2, rp, 01), cperm(rt, ri3, rp, 10), cperm(rt, ri4, rp, 11). This four input permutation is currently not possible using a single operation.

The concept described above may also be extended to provide for special features using a special bit in the mask. For example, using the conditions above where M is a 2-bit immediate and rt, ri and rp are 32 byte vectors, each element of the pattern register may be of the form $rp[i] = sm_0 m_1 p_0 p_1 p_2 p_3 p_4$, such that when s=1 a special operation is indicated. For example, special operations may include zero out, sign extend or other special functions.

Figure 3:
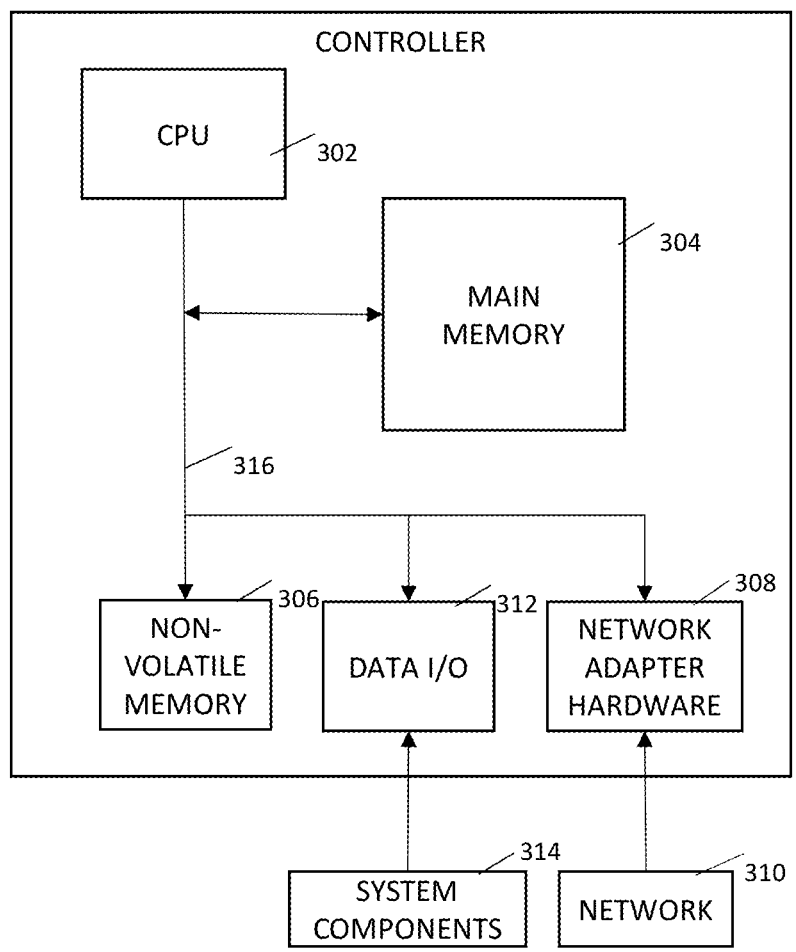
FIG. 3 is a block diagram of an example controller for use with the conditional permutation of FIG. 2, according to one embodiment of the present disclosure.

Turning now to FIG. 3, a block diagram illustrating a controller 300 is provided in accordance with one example of the present disclosure. The controller 300 is an example of a processing subsystem that is able to perform any of the above described processing operations, control operations, other operations, or combinations of these.

The controller 300 in this example includes a central processing unit (CPU) 302 that is communicatively connected to a main memory 304 (e.g., volatile memory) and a non-volatile memory 306 to support processing operations. The CPU 302 is further communicatively coupled to a network adapter hardware 308 to support input and output communications with external computing systems such as through the illustrated network 310.

The controller 300 further includes a data input/output (I/O) processor 312 that is able to be adapted to communicate with any type of equipment, such as the illustrated system components 314. The data input/output (I/O) processor 312, in various examples, is able to be configured to support any type of data communications connections including present day analog and/or digital techniques or via a future communications mechanism. A system bus 316 interconnects these system components.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for permuting data registers to a target register comprising:
    concatenating two or more data registers, each data register comprising a plurality of elements, to form a concatenated data register;
    executing a permutation instruction which uses one of the data registers as a data input register and conditionally selects an element of the data input register by comparing a portion of an element of a single pattern register to an immediate match field value; and
    copying the selected element of the data input register to an element in a target register at a position corresponding to a position of the element of the single pattern register.

2. The method of claim 1, wherein the selected element of the data input register is copied to the element in the target register when the portion of the element of the single pattern register matches the immediate match field value.

3. The method of claim 1, wherein the target register remains unchanged at the position corresponding to the position of the element of the single pattern register when the portion of the element of the single pattern register does not match the immediate match field value.

4. The method of claim 1, wherein each element of the plurality of elements of the two or more data registers is assigned a position.

5. The method of claim 4, wherein the selected element of the data input register is identified in the single pattern register by its position in the concatenated data register.

6. The method of claim 1, wherein the element of the single pattern register comprises a pattern match field and an index field.

7. The method of claim 6, further comprising:
    executing the permutation instruction using a different one of the data registers as a data input register and conditionally selecting an element of the data input register by comparing a portion of an element of a single pattern register to a different immediate match field value; and
    copying the selected element of the data input register to an element in the target register at a position corresponding to a position of the element of the single pattern register.

8. The method of claim 7, further comprising repeating the executing and the copying until each of the two or more data registers has been used as the data input register.

9. The method of claim 1, wherein the pattern register comprises a bit designating a special function.

10. The method of claim 9, wherein the special function is one of zero out and sign extend.

11. An apparatus comprising:
    a memory comprising a plurality of data registers, a pattern register, a target register, an immediate match field value and a permutation instruction; and
    a controller, communicatively coupled to the memory, the controller:
        concatenating two or more data registers, each data register comprising a plurality of elements, to form a concatenated data register;
        executing the permutation instruction which uses one of the data registers as a data input register and conditionally selects an element of the data input register by comparing a portion of an element of the pattern register to the immediate match field value; and
        copying the selected element of the data input register to an element in the target register at a position corresponding to a position of the element of the single pattern register.

12. The apparatus of claim 11, wherein the selected element of the data input register is copied to the element in the target register when the portion of the element of the single pattern register matches the immediate match field value.

13. The apparatus of claim 11, wherein the target register remains unchanged at the position corresponding to the position of the element of the single pattern register when the portion of the element of the single pattern register does not match the immediate match field value.

14. The apparatus of claim 11, wherein each element of the plurality of elements of the two or more data registers is assigned a position.

15. The apparatus of claim 14, wherein the selected element of the data input register is identified in the single pattern register by its position in the concatenated data register.

16. The apparatus of claim 11, wherein the single pattern register comprises a pattern match field and an index field.

17. The apparatus of claim 16, wherein the controller further:
   executes the permutation instruction using a different one of the data registers as a data input register and conditionally selecting an element of the data input register by comparing a portion of an element of a single pattern register to a different immediate match field value; and
   copies the selected element of the data input register to an element in the target register at a position corresponding to a position of the element of the single pattern register.

18. The apparatus of claim 17, wherein the controller further repeats the executing and the copying until each of the two or more data registers has been used as the data input register.

19. The apparatus of claim 11, wherein the pattern register comprises a bit designating a special function.

20. A non-transitory computer readable medium comprising instructions which, when executed by a controller of a computer, cause the controller to:
   concatenate two or more data registers, each data register comprising a plurality of elements, to form a concatenated data register;
   execute a permutation instruction which uses one of the data registers as a data input register and conditionally selects an element of the data input register by comparing a portion of an element of a single pattern register to an immediate match field value; and
   copy the selected element of the data input register to an element in a target register at a position corresponding to a position of the element of the single pattern register.

* * * * *